United States Patent [19]
Addiego

[11] Patent Number: 6,004,896
[45] Date of Patent: *Dec. 21, 1999

[54] HYDROCARBON ADSORBERS, METHOD OF MAKING AND USE THEREFOR

[75] Inventor: William P. Addiego, Big Flats, N.Y.

[73] Assignee: Corning Incorporated, Corning, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 09/072,661

[22] Filed: May 4, 1998

Related U.S. Application Data

[63] Continuation-in-part of application No. 08/724,125, Sep. 30, 1996, abandoned.

[51] Int. Cl.[6] ..................................................... B01J 29/06
[52] U.S. Cl. ............................... 502/64; 502/60; 502/71; 502/77; 502/79; 502/84; 502/85
[58] Field of Search ................................. 502/60, 84, 85, 502/71, 77, 79, 64

[56] References Cited

U.S. PATENT DOCUMENTS

| | | |
|---|---|---|
| 4,631,267 | 12/1986 | Lachman et al. . |
| 5,260,241 | 11/1993 | Addiego et al. . |
| 5,427,753 | 6/1995 | Miura et al. . |
| 5,567,405 | 10/1996 | Klattle et al. . |
| 5,633,217 | 5/1997 | Lynn . |

FOREIGN PATENT DOCUMENTS

| | | |
|---|---|---|
| 0 582 025 A1 | 2/1994 | European Pat. Off. . |
| 0 603 900 A1 | 6/1994 | European Pat. Off. . |
| 60-87850 | 5/1985 | Japan . |
| 3164412 | 10/1991 | Japan . |
| 6063394 | 6/1994 | Japan . |
| 7100386 | 4/1995 | Japan . |
| 94/11623 | 5/1994 | WIPO . |

*Primary Examiner*—Thomas Dunn
*Attorney, Agent, or Firm*—L. Rita Herzfeld

[57] ABSTRACT

A method for improving the adsorption properties of a hydrocarbon adsorber involves contacting a molecular sieve hydrocarbon adsorber at ambient temperature with an agent for modifying the acid sites of the molecular sieve to impregnate the molecular sieve with the agent. The average pore diameter of the intracrystalline porosity of the molecular sieve is about 3 to 20 angstroms. The agent has an anionic portion which is retained within the structure of the molecular sieve. The modified molecular sieve has the ability to retain adsorbed hydrocarbons at higher temperatures than the unmodified molecular sieve. The acid-modified molecular sieve can be used to remove hydrocarbons from a hydrocarbon-containing stream. The hydrocarbon-containing stream is passed through the modified adsorber at atmospheric pressure at a temperature ranging from room temperature to about 150° C. to cause adsorption and retention of the hydrocarbons. The adsorbed hydrocarbons can then be desorbed at a higher temperature than would otherwise occur with an unmodified adsorber.

9 Claims, 2 Drawing Sheets

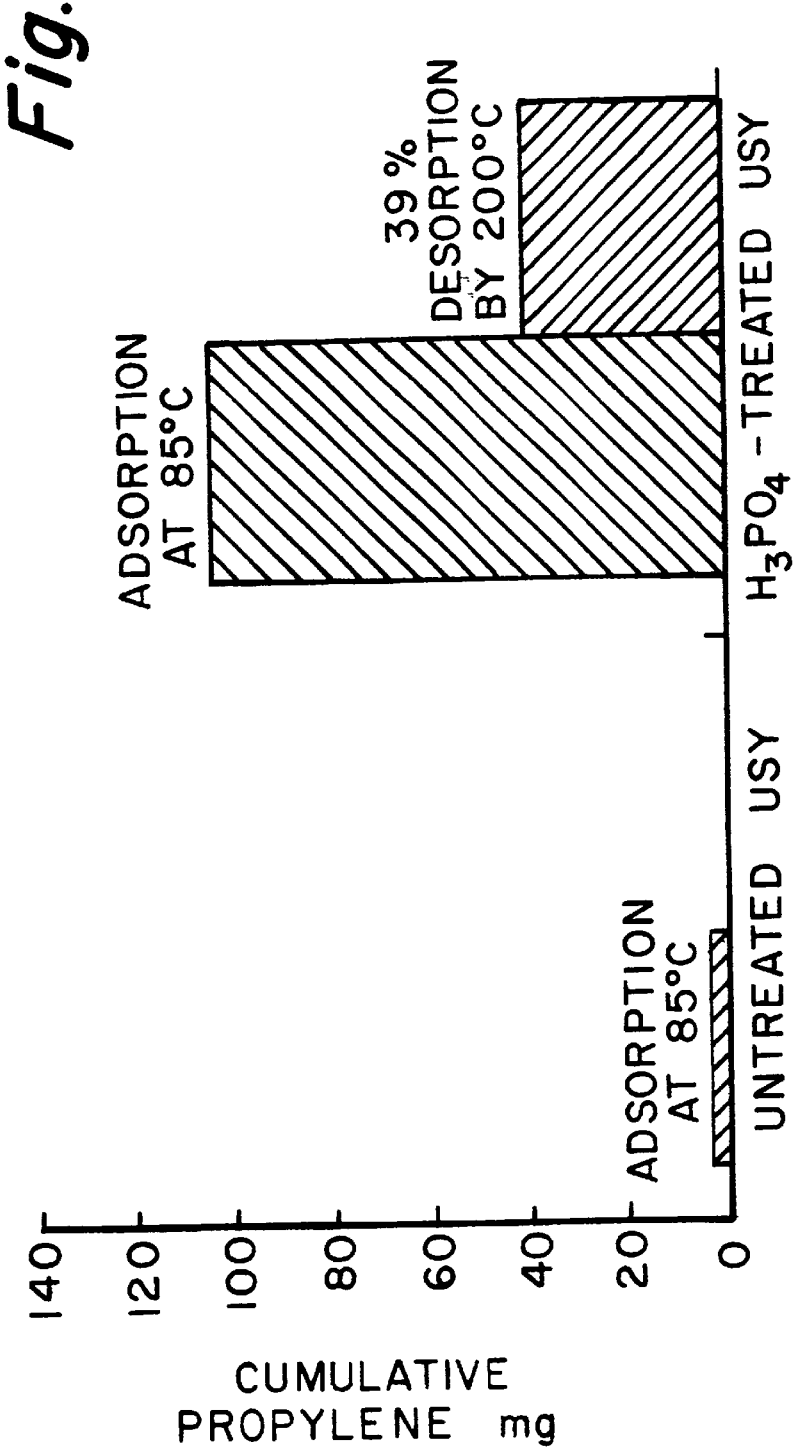

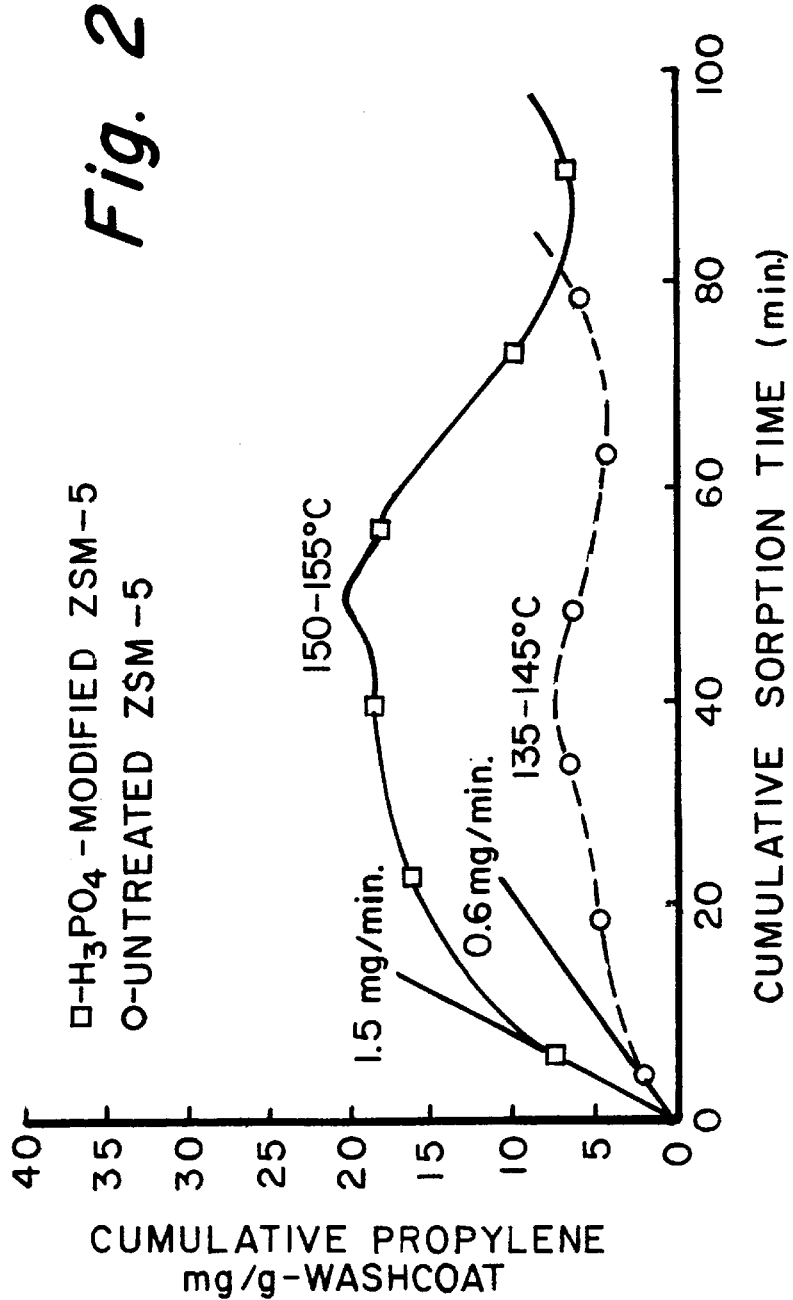

HYDROCARBON ADSORBERS, METHOD OF MAKING AND USE THEREFOR

This application is a continuation-in-part of application Ser. No. 08/724,125, filed Sep. 30, 1996 now abandoned.

This invention relates to improved adsorbers. In particular it relates to improvement of hydrocarbon adsorption especially by chemisorption, by modifying the acid sites of the adsorber. The improved adsorbers adsorb hydrocarbons and retain them longer than they would without the acid site modification. The improved adsorbers are advantageously used in adsorption of hydrocarbons from exhaust from an internal combustion engines, particularly during the cold-start period of automotive exhaust conversion. In this application, the adsorber hydrocarbons are retained long enough so as not to be prematurely desorbed before the main catalyst reaches operating temperature. The adsorbed hydrocarbons, once desorbed, are finally converted to innocuous products suitable for discharge into the atmosphere.

BACKGROUND OF THE INVENTION

Internal combustion engines emit a large amount of unburned hydrocarbons during cold engine start-up. In fact, a substantial fraction of the emitted hydrocarbons have been found to occur during the first ten seconds due to the rich fuel mixture.

Release of hydrocarbons immediately after starting an engine poses a special problem because at this point the temperature of the conventional catalytic reactor is not high enough for conversion to innocuous products. The catalysts utilized in catalytic converter systems are generally ineffective at ambient temperature and must reach high temperatures, often several hundred degrees e.g., 300–400° C. before they are activated.

One method of reducing cold start emissions is to temporarily adsorb hydrocarbons on zeolites which desorb at engine operating temperature and are converted by the main body catalyst.

One disadvantage of this method is that specific zeolites do not adsorb with equal efficiency at the full temperature range of the exhaust gas at start-up, that is, from room temperature to about 300° C. Additionally, the adsorbed hydrocarbons can prematurely desorb before the main conversion catalyst is up to operating temperature, thus emitting hydrocarbons to the atmosphere.

It would be desirable to have a way to efficiently adsorb hydrocarbons without premature desorption at engine start-up. It would also be desirable to maintain the adsorption activity over the age of the adsorber.

The present invention fills these needs.

SUMMARY OF THE INVENTION

In accordance with one aspect of the invention, there is provided a method for improving the adsorption properties of a hydrocarbon adsorber which involves contacting a molecular sieve hydrocarbon adsorber at ambient temperature with an agent for modifying the acid sites of the molecular sieve to impregnate the molecular sieve with the agent. The average pore diameter of the intracrystalline porosity of the molecular sieve is about 3 to 20 angstroms. The agent has an anionic portion which is retained within the structure of the molecular sieve. The modified molecular sieve has the ability to retain adsorbed hydrocarbons at higher temperatures than the unmodified molecular sieve.

In accordance with another aspect of the invention, the acid-modified molecular sieve described above can be used to remove hydrocarbons from a hydrocarbon-containing stream. The stream is passed through the modified adsorber at atmospheric pressure at a temperature ranging from room temperature to about 150° C. to cause adsorption and retention of the hydrocarbons. The adsorbed hydrocarbons can then be desorbed at a higher temperature than would otherwise occur with an unmodified adsorber.

BRIEF DESCRIPTION OF THE DRAWINGS

FIG. 1 is a plot of cumulative propylene adsorbed for the unmodified and acid-modified zeolite, and the amount desorbed from the acid-modified zeolite.

FIG. 2 is a plot of cumulative propylene adsorption and desorption (sorption) with respect to time and temperature.

DETAILED DESCRIPTION OF THE INVENTION

This invention provides an improved adsorber for hydrocarbons. By modification of its acid sites, an adsorber can be made to adsorb hydrocarbons, and retain them over a higher temperature range than would otherwise occur with the unmodified adsorber. In other words, acid site modification increases the chemisorption properties of the adsorber, and hence raises the desorption temperature. According to this invention, by acid modification is meant influencing the acid sites by some mechanism which is heretofore unknown.

This invention provides a method to modify hydrocarbon adsorbers by promoting strong adsorption sites to minimize low-temperature desorption of hydrocarbons, while minimizing weak chemisorption sites. This effect occurs by the incorporation of an acid site-modifying agent the purpose of which is to modify the adsorber so that it can adsorb hydrocarbons differently, (i.e., by improving chemisorption properties) than it would otherwise adsorb without this modification.

The adsorber is especially suited for use in conversion of exhaust gas from internal combustion such as auto exhaust gas to innocuous products. By innocuous products is meant those that are generally considered harmless to health and the environment such as $CO_2$, water, $O_2$, etc. The adsorber adsorbs hydrocarbons emitted during the start-up period and retains the adsorbed hydrocarbons long enough until the main catalyst is heated up to its operating temperature, whereupon the adsorbed hydrocarbon desorb and are then passed to the main catalyst to be converted to carbon dioxide and water. This is advantageous over presently used adsorbers which tend to desorb the hydrocarbons at lower temperatures and before the main catalyst has reached its operating temperature. The result of this premature desorption is that the desorbed hydrocarbons pass into the atmosphere, which is environmentally unacceptable.

One of the unique features of the improved adsorber of the present invention is that not only is the efficiency of adsorption and retention of the adsorbed hydrocarbons improved over the wider temperature range, but it tends to minimize coking in the adsorber which can occur due to incomplete desorption of hydrocarbons.

Another feature is that the improved adsorber has an improved lifespan enabling it to be an efficient adsorber-desorber over more use cycles than the unimproved adsorber (as shown by the aged samples in the examples that follow). This is especially advantageous in the harsh thermally unpredictable environment of auto exhaust conversion where exposure to fluctuating temperatures, oxidizing agents, and water can readily degrade adsorbers and catalysts.

The method of the present invention is to improve a hydrocarbon adsorber by increasing the adsorption strength and/or capacity of the molecular sieve. This is done by contacting the adsorber with an acidity-modifying (or acid site-modifying) agent that has an anionic portion. The anionic portion of the acidity modifying agent is retained within the structure of the agent but is not ion exchanged into the agent. (The cationic portion may or may not be ion exchanged.) The purpose of the acidity-modifying agent is to alter the acidity of the adsorber to increase the residence time of the hydrocarbons on the adsorber.

Some especially useful acid-modifying agents are superacids, phosphate-containing compounds, or combinations of these. Some typical phosphate-containing compounds are ortho and meta phosphoric acids, pyrophosphate compounds with and without organic ligands, or organic or chelated ammonium phosphates, or combinations of these. Superacids are utilized in solid form, that is, they can be derived from a liquid or solution but are supported on a solid support. One typical superacid is sulfate/zirconia. Other potential species that can be used as acid modifying agents are alkaline earths, halides, and transition metals to possibly promote oligomerization of adsorbed hydrocarbons or otherwise increase the residence time of adsorbed hydrocarbons. If transition metals are used, they are on the outside of the molecular sieve and not ion-exchanged into molecular sieve structure, as such ion-exchanging into the molecular sieve would adversely affect the adsorption properties of the molecular sieve. Other agents such as for example EDTA can also be used to promote hydrocarbon residence time.

Phosphoric acid is an especially preferred modifying agent because it tends to promote the structural integrity of the molecular sieve framework while improving the adsorption/desorption behavior of the adsorber. Another advantage of phosphoric acid over other reagents is that it does not volatize from the adsorber during use, nor does it decompose to yield a product that adversely affects adsorption.

The hydrocarbon adsorbers of this invention are molecular sieves.

Molecular sieves are crystalline substances having pores of size suitable for adsorbing molecules.

Some types of molecular sieves which are preferred for the practice of the present invention are carbon molecular sieves, zeolites, metallophosphates, aluminophosphates, silicoaluminophosphates, and combinations of these.

Carbon molecular sieves have well defined micropores made out of carbon material.

Zeolites are molecular sieves that are well-suited to the practice of the present invention, especially zeolites having a $SiO_2/Al_2O_3$ mole ratio of the zeolite is about 50 to 250.

Some preferred zeolites are faujasite type, especially preferred of which is ultra stable Y, (USY), X such as 13X, pentasil type, preferred of which are ZSM type such as ZSM-5, and mordenite, and beta zeolite, and combinations of these.

It is advantageous that the crystalline structure have tetrahedral atoms that are either Al and Si, such as e.g., $SiO_2/Al_2O_3$ based zeolites, or Al and P, such as e.g. $AlPO_4$ zeolites (ALPO'S), or Al, Si, and P, such as e.g. silica-alumino-phosphate molecular sieves (SAPO'S). These adsorbers can have one or more of their tetrahedral atoms substituted with other atoms such as e.g. Ge, and Ti.

The hydrocarbon adsorber must have within its intracrystalline porosity, an average pore diameter suitable for adsorbing both large and smaller hydrocarbons, that is about 3 to 20 angstroms. One suitable pore size combination is for the adsorber component to have one portion which has an average pore diameter suitable for adsorbing smaller hydrocarbons, or about 3 to 8 angstroms and another portion having an average pore diameter suitable for adsorbing larger hydrocarbons or greater than 8 to about 20 angstroms.

For example ZSM-5 zeolite has an average pore diameter of about 5.5 angstroms, enabling it to effectively adsorb the smaller hydrocarbons, i.e., those having about 2–5 carbon atoms in the main chain but too small to adsorb the larger hydrocarbons; while ultrastable Y has an average pore diameter of about 7.5, enabling it to effectively adsorb hydrocarbons having greater than about 5 carbon atoms in the main chain but too large to adsorb the smaller hydrocarbons. Beta zeolite has two distinct pore diameters averaging about 5.5 angstroms in one kind of pore and about 7 angstroms in the other kind of pore. This dual pore size enables it to adsorb a wide range of hydrocarbons. This is advantageous in conversion of exhaust from internal combustion engines which can contain a wide range of hydrocarbons.

Some adsorbers that are especially suited are ZSM-5, ultrastable Y, beta, and combinations of these. One especially useful combination is ZSM-5 and ultrastable Y zeolites because their respective pore sizes complement one another.

The $SiO_2/Al_2O_3$ mole ratio is preferably about 50 to 250 for greater strength.

Some especially advantageous acid modified adsorbers are ZSM-5 and ultrastable Y zeolites modified with phosphoric acid, having most typically about 1–25 wt. %, and preferably about 1–15%, or more preferably about 3–10% phosphoric acid based on the acid-modified zeolite. For example, ZSM-5 zeolite having about 5% phosphoric acid, and ultrastable Y having about 10% phosphoric acid are especially advantageous as will be showing in the examples that follow.

The contacting of the acid and the adsorber is done at ambient temperatures. It can be done in a number of ways. Some of the most typical techniques are given below, although it is to be understood that the invention is not limited to such techniques.

In accordance with a preferred embodiment, the adsorber is mixed with the acidity-modifying agent in the form of a slurry. Although it is not required, as the modified agent can be used as is or just air-dried to remove liquids, the material is preferably heat-treated. This normally means drying to remove liquid phases, and calcining to convert the agent, especially the anionic portion to its most stable condition. Calcining is preferably at about 300 to 800° C., e.g. 550° C. for about 2 to 6 hours. The calcined material is then mixed with a suitable binder such as boehmite, in a slurry. As a non-limiting example, a zeolite is mixed with phosphoric acid solution to yield the desired wt. % level of phosphoric acid in the zeolite after calcination. For example, about 0.0587 g of concentrated phosphoric acid per gram of zeolite yields a modified zeolite with about 5 wt. % phosphoric acid. This material is dried and calcined at about 550° C. for several hours. The material is then mixed with a binder such as boehmite in aqueous slurry form. The solids content is about 85 wt. % zeolite with about 15 wt. % binder (calculated as alumina, $Al_2O_3$). The water-to-solid ratio for the washcoat slurry is about 1:1 to 1.5:1. The pH of the slurry is adjusted to about 4 with nitric acid. The adsorber-agent-binder slurry can then be washcoated onto a substrate directly. For example, honeycombs are washcoated by dipping them into a slurry such as the phosphoric acid modified zeolite slurry described above, removing them, clearing them of excess slurry, drying, and then calcining them as described above. The advantage of preparing a separate precipitate with the acidity-modifying agent before forming a washcoating slurry is to ensure that all the acidity-modifying agent has been impregnated into the adsorber and not on the binder.

Another example of a slurry of an acid-modified adsorber is $H_3PO_4$ added to a zeolite to give e.g. about 5 wt. % $H_3PO_4$ based on the acid-modified zeolite. This acid modified zeolite is calcined at about 550° C. It is added to a solution of aluminum nitrate and ammonium phosphate. The pH of the resulting slurry is raised to about 8–9 with ammonium hydroxide, causing precipitation of aluminophosphate material ($AlPO_4$—$Al_2O_3$). The purpose of the aluminophosphate material is to modify the mesoporosity of the washcoat and to act as an additional support for a catalyst if desired. The entire solids are centrifuged or filtered, and washed with isopropyl alcohol several times. The solid which is a combination of the aluminophosphate material and the $H_3PO_4$-modified zeolite, is then calcined as described above. The calcined powder is mixed with binder, e.g. boehmite (which on calcination yields $Al_2O_3$) to form a slurry having a solid composition of about 95 wt. % $AlPO_4$—$Al_2O_3$/$H_3PO_4$/zeolite and about 5 wt. % binder, e.g. $Al_2O_3$ from boehmite. The slurry can be washcoated onto a substrate.

Still another example of a slurry of acid-modified adsorber is $H_3PO_4$ added to a zeolite is similar to the slurry above but with silicic acid and aluminum nitrate instead of ammonium phosphate.

Alternately, one can add a zirconium salt to either of the above combinations.

Another method is to mix adsorber with the acidity-modifying agent and a binder in the form of an aqueous slurry which is then washcoated onto a substrate directly. For example, a slurry is made of the adsorber, the acidity-modifying agent, and binders such as metal oxides as alumina, silica, and/or zirconia, or their precursors such colloidal aluminas as boehmite, and colloidal forms of silica, along with promoters such as ceria, etc which are known in the art. After washcoating a substrate such as a honeycomb with the slurry, the washcoated substrate is dried and calcined.

In another method, a substrate e.g., honeycomb washcoated with adsorber, e.g. zeolite and binder e.g. alumina, is immersed in a solution of acidity-modifying agent, e.g. phosphoric acid, such that the agent that is absorbed by the washcoat and the substrate. The resulting washcoated substrate with acidity-modifying agent is then dried and calcined as described above.

In another preparation, zeolites of different crystal structures, intracrystalline porosity, and aluminum content or other framework atoms that are capable of substituting for either aluminum or silicon can be used. The zeolites are modified with an acid or salt, or combinations by impregnation. For example, beta zeolite can be mixed with an ammonium fluoride salt followed by impregnation with phosphoric acid. This is followed by drying and calcining as previously described, and then made into a slurry for washcoating.

The above washcoating methods can be used to make layered adsorbers. For example, to a cordierite honeycomb, an acid-modified ZSM-5 zeolite and alumina washcoat is added. To this is added a washcoat of USY zeolite and zirconia to yield a second, or top layer adsorber with a different intracrystalline porosity and washcoat mesoporosity from the first layer. The purpose of layering the adsorber is to modify adsorption/desorption kinetics. For instance, small hydrocarbons such as propylene, can pass through the top layer and adsorb in the bottom layer, while larger molecules, such as xylenes, can adsorb in the top layer. Diffusion kinetics into and out of the adsorber can be modified from a single-layered adsorber.

Still another method is to contact the adsorber with the acid and produce a formable mixture which is shaped into a monolith such as by extrusion, e.g. into a honeycomb.

Some substrate materials that are especially suited to the practice of the present invention, although it is to be understood that the invention is not limited to such, are those made of cordierite, mullite, clay, talc, zircon, zirconia, zirconates, zirconia-spinel, magnesium alumino-silicates, spinel, alumina, silica, silicates, borides, alumino-silicates, eg., porcelains, lithium aluminosilicates, alumina silica, feldspar titania, fused silica, nitrides, borides, carbides, eg., silicon carbide, silicon nitride, or mixtures of these. Especially useful substrate materials are cordierite and/or mullite. Also crystalline aluminosilicates, aluminum phosphates, and combinations thereof can be used. These latter materials are molecular sieves than can be extruded or otherwise formed as substrates for the acid-modified adsorber. An additional washcoat layer of zeolite or other adsorber can be put on the substrate to yield a layered adsorber.

The preferred substrate shape is a multicellular thin walled structure such as a honeycomb for high surface area of reaction.

Some examples of honeycombs which can be used in the practice of the present invention, although it is to be understood that the invention is not limited to these, are about 94 cells/cm$^2$ (600 cells/in$^2$), about 62 cells/cm$^2$ (400 cells/in$^2$), or about 47 cells/cm$^2$ (300 cells/in$^2$), about 31 cells/cm$^2$ (200 cells/in$^2$), or about 15 cells/cm$^2$ (100 cells/in$^2$), or about 1.4 cells/cm$^2$ (9 cells/in$^2$). Typical wall (web) thicknesses in catalytric conversion applications, for example, are about 6 mils (about 0.15 mm) for 400 cells/in$^2$ (62 cells/cm$^2$) honeycombs. Web thicknesses range typically from about 4 to about 35 mils (about 0.1 to about 0.9 mm). The external size and shape of the body is controlled by the application.

The modified adsorber can be made into a monolithic structure or formed body by shaping a plastic mixture of the adsorber, the acidifying agent, and binders, forming aids and vehicle. Alternately the structure can be shaped from a plastic mixture absent the acidifying agent. After firing, the shaped adsorber would then be impregnated with the acidifying agent.

Shaping of the zeolite into the monolith is done by techniques known in the art, and is preferably by extrusion into e.g. the shapes described above.

One preferred method of shaping the zeolite is to form a plastic mixture of the acid-modified and calcined adsorber, the formation of which was described previously, and binders such as silicone resin, which is a precursor of $SiO_2$ binder, dissolved in a solvent such as alcohols as isopropyl alcohol or dibasic ester, such as dimethyl succinate, dimethyl adipate, and/or dimethyl glutarate, and temporary binders such as methylcellulose and/or its derivatives, and optionally co-binders suchi as polyvinyl alcohol or polyvinyl acetate, shape the mixture as by extrusion, followed by drying and heat-treating. Such methods are described in U.S.

Pat. Nos. 4,631,267 and 5,663,217, which are herein incorporated by reference as filed. In this embodiment, one useful technique for making the acid-modified adsorber that is to be used in the forming mixture is to first impregnate the adsorber, e.g. zeolite with phosphoric to obtain a phosphoric acid content of about 1–25%, preferably about 1–15% and most preferably about 3–10% by weight based on the acid modified adsorber. One way of making the adsorber structure is to form a mixture of about 65% to 95% acid-modified and calcined adsorber, and about 5% to 35% silicone resin with super additions (i.e., based on the zeolite and silicone resin) of about 1% to 10%, and preferably about 3% to 6% organic binder, e.g. methylcellulose and/or hydroxypropyl methylcellulose, preferably about 1 to 2% co-binder, e.g., polyvinyl alcohol. Preferably the silicone resin is dissolved in sufficient dibasic ester solvent to solubilize the entire charge of silicone resin. This is usually about 20 weight parts of silicone resin in about 15 weight parts of dibasic ester although this can vary. The mixture is then shaped into a green body such as by extrusion, preferably into a honeycomb. The green body is dried by methods known in the art to remove the liquid phases. The dried body is then heat-treated to develop strength, such as at temperatures of about 400° C. to 1000° C.

The acid-modified adsorber in any of the above-described forms is used to adsorb hydrocarbons at a given first temperature range, and retain the adsorbed hydrocarbons at this temperature range. The hydrocarbons by virtue of the acid modified adsorber are retained over the temperature range where they would ordinarily desorb when the adsorber is in the unmodified state. In order to desorb, the hydrocarbons, which are held by the acid modified adsorber of the present invention must be exposed to a higher temperature than is needed for desorption on an unmodified adsorber. The benefit of this higher desorption temperature is that the hydrocarbons do not prematurely desorb.

In continuous operations such as those carried out at atmospheric pressure, high space velocity, under oxidizing conditions, in the presence of water, and temperatures varying widely and sometimes unpredictably, such as in exhaust gas purification from internal combustion engines, the adsorbed hydrocarbons are efficiently adsorbed and are retained longer than when the adsorber is unmodified. They are retained long enough for the main and/or burnoff catalyst(s) to get up to operating temperature. At this time, the adsorbed hydrocarbons would desorb and be passed to the main and/or burnoff catalyst(s) for conversion to innocuous products. Thus unconverted hydrocarbons do not enter the atmosphere.

In automotive exhaust purification, in the start up period, which is normally considered to be from room temperature to about 100° C., the initial hydrocarbons which are emitted are adsorbed by the modified adsorber. They are retained on the adsorber well into the light-off period, that is, when the exhaust gases are hot enough to heat the main or burnoff catalyst up to operating temperature which is about 200–350° C. With unmodified adsorbers, the adsorbed hydrocarbons would desorb much earlier in the process, at around 120° C. At this point, the main and/or burnoff catalyst(s) are not up to operating temperature and are unable to fully convert hydrocarbons to innocuous products as $CO_2$ and water. Some of the hydrocarbons therefore enter the atmosphere unconverted. Having the adsorbers modified according to the present invention prevents this premature escape of unconverted hydrocarbons into the atmosphere.

To more fully illustrate the invention, the following non-limiting examples are presented. All parts, portions, and percentages are on a weight basis unless otherwise stated.

EXAMPLE 1

A ZSM-5 zeolite with a Si/Al mole ratio of about 250/1 was calcined at about 550° C to oxidine any carbon residue from the zeolite synthesis. A portion of the zeolite was treated with a solution of phosphoric acid to yield about 5% phosphoric acid in the acid modified zeolite after drying and calcination. The phosphoric acid treated zeolite was then dried and calcined. Each zeolite with and without phosphoric acid was then separately made into a slurry in which the solids made up about 85% zeolite (or treated zeolite) and about 15% solid binder alumina as boehmite. Cordierite honeycombs were washcoated, and all samples had about 2 grams of washcoat. The samples were used in the various tests described below.

Samples were then exposed in a laboratory test to propylene probe gas in the presence of propane, oxygen, carbon monoxide, nitric oxide, hydrogen, carbon dioxide, and nitrogen at about 80° C. After maximum adsorption, the samples were then desorbed of the amount of hydrocarbon that had adsorbed on them, in either a stream of nitrogen or the adsorption gas mixture. The temperature is raised at about 10° C./min. to about 600° C., and desorption is monitored by a flame ionization detector. The results of the adsorption and desorption tests are given in Tables 1 and 2 below.

TABLE 1

Adsorption of Propylene
Desorption in Nitrogen
(Un-aged Pre-Calcined Adsorber)
(Example 1)

| | | | Adsorption | |
|---|---|---|---|---|
| Sample # | Description of Adsorber | ° C. | mg Adsorbed/g Zeolite | % Desorbed by 200° C. |
| 1-1 | Untreated Zeolite | 85 | 66 | 31 |
| 1-2 | Zeolite modified with 5% $H_3PO_4$ | 85 | 62 | 22 |

TABLE 2

Adsorption of Propylene
Desorption in Mixed Gas Stream
Containing Propylene
(Un-aged Pre-Calcined Adsorber)
(Example 1)

| | | | Adsorption | |
|---|---|---|---|---|
| Sample # | Description of Adsorber | ° C. | mg Adsorbed/g Zeolite | Temperature of Maximum Desorption |
| 2-1 | Untreated Zeolite | 85 | 44 | 140 |
| 2-2 | Zeolite modified with 5% $H_3PO_4$ | 85 | 37 | 160 |

Table 1 shows that the amount of propylene adsorbed on both samples is similar, but that by about 200° C., the phosphoric acid treated sample desorbed less, about 30% less propylene than the untreated sample in the nitrogen stream.

Table 2 gives adsorption and desorption data on samples in which propylene and propane were desorbed in the same gases in which they were adsorbed. The treated sample significantly delays desorption of propylene, as shown by the maximum temperature at which adsorption still occurred. Differences in adsorption capacity are not generally significant.

EXAMPLE 2

Some of the treated and untreated samples were aged in steam at about 850° C. for about 6 hours. The adsorption results of these samples from streams containing (1) propylene and oxygen, carbon monoxide, nitric oxide, hydrogen, carbon dioxide, and nitrogen gases, and (2) both propylene and propane, and oxygen, carbon monoxide, nitric oxide, hydrogen, carbon dioxide, and nitrogen gases are given in Table 3 below.

TABLE 3

Adsorption By Steam-Aged Zeolite (Example 2)

| | Description | | Adsorption | | |
|---|---|---|---|---|---|
| Sample # | of Adsorber | Feed Stream | ° C. | Redox Ratio | mg Adsorbed/g |
| 3-1 | Untreated Zeolite | $C_3H_6$ & $C_3H_8$ | 85 | 3.6 | 11 |
| 3-2 | Zeolite Modified with 5% $H_3PO_4$ | $C_3H_6$ & $C_3H_8$ | 85 | 3.6 | 21 |
| 3-3 | Untreated Zeolite | $C_3H_6$ | 85 | 3.3 | 18 |
| 3-4 | Zeolite Modified with 5% $H_3PO_4$ | $C_3H_6$ | 85 | 3.3 | 31 |

The redox ratio is the mole ratio of reducing agents to oxidizing agents in the feed stream.

Table 3 shows that after the steam aging, the phosphoric acid-treated ZSM-5 preserved about twice the chemisorption capacity than was available on a comparably aged ZSM-5 sample, both with and without propane (where the propylene:propane volume ppm ratio was about 2:1.) While propane does not chemisorb in zeolites, it can attenuate propylene adsorption due to steric hindrance; this effect occurs on samples with and without phosphoric acid treatment. The point of this example was to show that despite the steric effect of propane on propylene adsorption, the trends of phosphoric acid treatment still hold.

EXAMPLE 3

Adsorption of some of the steam-aged samples was measured at 25° C. and 85° C. with varying redox ratios. The results are given in Table 4 below.

TABLE 4

Adsorption By Steam-Aged Zeolite (Example 3)

| | Description | | | Adsorption |
|---|---|---|---|---|
| Sample # | of Adsorber | ° C. | Redox Ratio | mg Adsorber/ g zeolite |
| 4-1 | Untreated Zeolite | 25 | 1.1 | 4 |
| 4-2 | Zeolite Modified with 5% $H_3PO_4$ | 25 | 1.1 | 5 |

TABLE 4-continued

Adsorption By Steam-Aged Zeolite (Example 3)

| | Description | | | Adsorption |
|---|---|---|---|---|
| Sample # | of Adsorber | ° C. | Redox Ratio | mg Adsorber/ g zeolite |
| 4-3 | Untreated Zeolite | 25 | 3.6 | 3 |
| 4-4 | Zeolite Modified with 5% $H_3PO_4$ | 25 | 3.6 | 4 |
| 4-5 | Untreated Zeolite | 85 | 1.1 | 9 |
| 4-6 | Zeolite Modified with 5% $H_3PO_4$ | 80 | 1.1 | 24 |
| 4-7 | Untreated Zeolite | 85 | 3.6 | 14 |
| 4-8 | Zeolite Modified with 5% $H_3PO_4$ | 85 | 3.6 | 26 |

Redox ratio was changed from 1.1 to 3.6 by decreasing the oxygen concentration from about 0.77% to about 0.20% by volume.

At about 25° C. physisorption occurs with very little chemisorption. The amounts of propylene and propane adsorbed are not distinguished by species. Treating ZSM-5 with phosphoric acid did not enhance chemisorption at very low temperatures, and it did not interfere with the physisorption capacity of propylene and propane. At about 85° C., only chemisorption occurs and is indicated by the significant increase in the amount of hydrocarbon that is adsorbed. Table 4 shows also that the adsorption capacity is improved under reducing conditions (redox ratio of about 3.6) for untreated samples, but the phosphoric acid-treated ZSM-5 always has much higher chemisorption capacity when other conditions are constant.

EXAMPLE 4

The general procedure of Example 1 was followed with a USY zeolite which was treated with phosphoric acid to yield about 10% phosphoric acid. Propylene adsorption at about 85° C. was measured on untreated and treated samples and desorption in a stream of $N_2$ by about 200° C. was measured for the treated zeolite. The results are summarized in FIG. 1 which is a plot of cumulative propylene adsorbed for the untreated and treated samples and the amount desorbed from the treated zeolite. Without phosphoric acid treatment, hardly any propylene adsorbs on the USY zeolite at about 85° C. With phosphoric acid, adsorption is significantly increased. After aging at about 850° C., chemisorption is retained at about 8 mg of propylene per gram of the zeolite as shown in Table 5 below.

TABLE 5

Adsorption af Propylene Fresh and Aged Adsorber (Example 4)

| | Adsorption (mg/g USY | |
|---|---|---|
| Sample | Fresh | Aged |
| USY | 3 | 0 |
| USY + 5% $H_3PO_4$ | 104 | 8 |

EXAMPLE 5

Samples of ZSM-5 zeolite both untreated, and treated with phosphoric acid and having about 5% phosphoric acid, were washcoated on honeycombs and aged in steam at about 850° C. for about 6 hours. The samples were then tested for propylene adsorption and desorption by passing the gas stream through the zeolite at about 85° C. until maximum or near maximum adsorption occurred. Samples were considered to be at maximum or near-maximum adsorption when the effluent gas stream from the zeolite contained 95% or more of its starting propylene content. For the untreated sample, it took about 25 minutes for maximum or near-maximum adsorption to take place; while the treated sample took much longer, about 40 minutes. Differences in time for maximum or near-maximum adsorption are due to the different adsorption capacities in the two samples. The treated sample has a higher adsorption capacity and therefore requires more time for adsorption to reach its maximum. After maximum adsorption was reached, the temperature was ramped at about 10° C./min. to about 525° C. for desorption. The results are given in FIG. 2 which is a plot of cumulative propylene adsorption and desorption (sorption) with respect to time and temperature. The initial rate of adsorption on the treated sample is much higher than on the untreated sample. The total amount of adsorbed propylene is much higher, about 20 mg/g of washcoat vs about 8 mg/g of washcoat for the untreated sample. Also, the temperature range of maximum propylene adsorption before desorption is higher in the treated sample than in the untreated sample.

It should be understood that while the present invention has been described in detail with respect to certain illustrative and specific embodiments thereof, it should not be considered limited to such but may be used in other ways without departing from the spirit of the invention and the scope of the appended claims.

What is claimed is:

1. A method for improving the adsorption properties of an adsorber for hydrocarbons in an exhaust gas stream, the method consisting essentially of:
    a) providing a molecular sieve hydrocarbon adsorber selected from the group consisting of ZSM-5 zeolite, beta zeolite, ultrastable Y zeolite, and combinations thereof; and
    b) contacting the molecular sieve at ambient temperature with phosphoric acid, to impregnate the molecular sieve with the phosphoric acid and produce a modified molecular sieve
       the modified molecular sieve having ability to adsorb a greater amount of hydrocarbons at a temperature of about 80° C. to 85° C. from an exhaust gas stream having a mole ratio of reducing agents to oxidizing agents of about 1.1 to 3.6 than the unmodified molecular sieve, and to retain the adsorbed hydrocarbons until a temperature of at least about 150° C. is reached.

2. A method of claim 1 comprising the additional step of heat-treating the resulting modified molecular sieve.

3. A method of claim 1 wherein the phosphoric acid content in the modified molecular sieve is about 1% to 25% by weight.

4. A method of claim 1 wherein the phosphoric acid content in the modified molecular sieve is about 3% to 10% by weight and the modified molecular sieve is selected from the group consisting of ZSM-5 and ultrastable Y.

5. A method of claim 1 wherein the molecular sieve is combined with binder and a vehicle and applied as a washcoat onto a substrate, followed by heat-treating the resulting washcoated substrate.

6. A method of claim 5 wherein the substrate is a honeycomb structure.

7. A method of claim 1 wherein the molecular sieve is mixed with binder and vehicle to form a plastic mixture which is shaped into a body, followed by heat-treating the body.

8. A method of claim 7 wherein the mixture is shaped by extrusion.

9. A method of claim 8 wherein the mixture is extruded into a honeycomb structure.

* * * * *